United States Patent
Pellenc

[19]

[11] Patent Number: 6,155,036
[45] Date of Patent: Dec. 5, 2000

[54] MACHINE AND METHOD FOR THE SELECTIVE HARVEST OF BERRIES

[75] Inventor: Roger Pellenc, Pertuis, France

[73] Assignee: Pellenc, Pertuis, France

[21] Appl. No.: 09/148,660

[22] Filed: Sep. 4, 1998

[30] Foreign Application Priority Data

Sep. 5, 1997 [FR] France .................................. 97 11264

[51] Int. Cl.[7] .................................................. A01D 46/28
[52] U.S. Cl. .......................................... 56/328.1; 56/330
[58] Field of Search ................................. 56/328.1, 329, 56/330, 331, 340.1

[56] References Cited

U.S. PATENT DOCUMENTS

| | | | |
|---|---|---|---|
| 3,636,688 | 1/1972 | Fontan et al. ............................... | 56/330 |
| 3,727,388 | 4/1973 | Smith ......................................... | 56/330 |
| 4,172,352 | 10/1979 | McCarthy et al. . | |
| 4,769,979 | 9/1988 | Merant ....................................... | 56/330 |
| 4,771,594 | 9/1988 | Deux et al. ................................. | 56/330 |
| 4,903,471 | 2/1990 | Bunnelle ................................. | 56/340.1 |
| 4,924,666 | 5/1990 | Poncet ....................................... | 56/330 |
| 4,976,094 | 12/1990 | Willamson et al. ....................... | 56/330 |
| 5,642,610 | 7/1997 | Dupon et al. ........................... | 56/340.1 |
| 5,842,334 | 12/1998 | Slates ..................................... | 56/330 X |
| 5,921,074 | 7/1999 | Scott et al. ................................ | 56/330 |
| 6,003,294 | 12/1999 | Fitzgerald et al. . | |

FOREIGN PATENT DOCUMENTS

| | | |
|---|---|---|
| 0200631 | 11/1986 | European Pat. Off. . |
| 2357449 | 2/1978 | France . |
| 2373222 | 7/1978 | France . |
| 2437769 | 4/1980 | France . |
| 2473258 | 7/1981 | France . |
| 2638602 | 5/1990 | France . |
| 2768015 | 3/1999 | France . |

*Primary Examiner*—James A. Lisehora
*Attorney, Agent, or Firm*—Grenblum & Bernstein, P.L.C.

[57] ABSTRACT

Machine for the selective harvest of berries, for example, machine for gathering grapes, of the type having a shaking system constituted by two berry picking assemblies each having a plurality of superposed gathering arms, characterized in that said shaking system is coupled to at least one driving electro-hydraulic device including at least one hydraulic jack controlled by a servovalve or by a proportional solenoid valve controlled by a microprocessor electronic control unit.

58 Claims, 8 Drawing Sheets

FIG. 1

DIRECTION OF ADVANCE OF MACHINE

SEQUENCE OF THE CYCLE IN THE ORDER (0-1-0-2-0)

MACHINE AND METHOD FOR THE SELECTIVE HARVEST OF BERRIES

CROSS-REFERENCE TO RELATED APPLICATIONS

The present application claims priority under 35 U.S.C. § 119 of French Patent Application No. 97/11264, filed on Sep. 5, 1997, the disclosure of which is expressly incorporated by reference herein in its entirety.

BACKGROUND OF THE INVENTION

1. Field of the Invention

The present invention relates to a machine and a method for the selective harvesting of berries, such as grapes, raspberries, red currants, blackcurrants, etc. More specifically, the invention relates to a machine for gathering grapes and a method for the selective gathering of grapes.

2. Background and Material Information

It is known that the production of choice wines (guaranteed quality label wines) places limits on vine growers, during harvest, not to exceed outputs per hectare and these are regulated as a function of the vintages.

Furthermore, it is known that worldwide viticulture and especially French viticulture are increasingly oriented toward quality wine production. In the most prestigious vineyards, wine-harvesters typically perform a selective harvest of the grapes manually. When gathering these grapes, they harvest the first rate berries in a first bucket, and the remainder of the berries in a second bucket. Other vine growers from less prestigious vintages would like to use this harvesting method to increase the quality of their production; unfortunately, the cost of performing a selective harvest manually is prohibitive.

The conventional harvest systems equipped with shakers or gathering arms, that do not lash the vegetation, have made it possible to perform a coarsely selective mechanical harvest. However, these systems have proven inflexible since they have a limited ability to adjust the movement parameters of the shakers or gathering arms. For example, if the shaking rate is set at 550 strokes/minute, for a given vineyard, most of the berries are likely to be harvested, whereas if the rate is reduced to 450 strokes/minute, a certain quantity of grapes will be left on the vinestocks. Upon observation, it is noted that the berries that tend to remain on the stocks after shaking are the most difficult to pick, as these are green or hardly ripe. Moreover, in with the current mechanically driven harvest systems of the grape gathering machines, shaking is not controllable in relation to the advance; only the shaking rate can typically be set from the steering station. Others desirable settings, such as:

shaking amplitude;

pinching (pinching is the space that exists between two gathering arms arranged on both sides of the median vertical plane of the shaking system), are currently performed manually, using tools such as wrenches, and require stoppage of the machine and cleaning of the components involved in the setting.

Furthermore, current mechanically driven shaking systems do not offer any possibility for adjusting the acceleration (stiffness) of the gathering arms, and do not make it possible to operate in a mode which is proportional to the advance, or in a decompression mode.

SUMMARY OF THE INVENTION

Therefore, the object of the present invention is to overcome the aforementioned drawbacks and deficiencies of the berry harvesting machines having a reciprocating shaking system.

According to a first characteristic arrangement of the machine and of the method of the invention, the shaking system, includes two berry picking assemblies each having at least one gathering arm, and, preferably, a plurality of superposed shakers or gathering arms, are coupled to at least one driving electro-hydraulic device having at least one hydraulic jack controlled by a servovalve or by a proportional solenoid valve and controlled by an electronic control unit, preferably a microprocessor.

According to a preferred and very advantageous implementation of the machine and method of the invention, each berry picking assembly is individually coupled to a driving electro-hydraulic device having a hydraulic jack controlled by a distinct servovalve or proportional solenoid valve, these two servovalves or proportional solenoid valves being controlled by the microprocessor electronic unit.

Due to the machine and method of the invention, it is especially possible to:

generate an infinity of harvesting movements, which cannot be obtained by current mechanically driven systems;

determine the best parameters for the gathering arms adapted to each variety of vine-plant and training: rate, amplitude, pinching and acceleration (stiffness), without any mechanical intervention, by only acting on the control console of the electronic unit;

generate a shaking proportional to the advance;

introduce decompression cycles which enable the vegetable not to be crushed as much, and the bunches of grapes to be free during their fall;

select the best shaking mode:
not proportional to the advance;
proportional to the advance;
decompression;

set shaking parameters directly from the control console, by varying the settings of the pinching of the gathering arms, shaking rate, shaking amplitude, shaking acceleration, and decompression of the gathering arms.

According to another characteristic arrangement of the invention, an appropriate software program enables the vine grower to determine the optimum parameters for the harvest, and to program them in a database of lots and/or varieties of vines, depending on each lot, so to be able to use them year by year on identical varieties.

It is understood that the possibility of quickly and easily setting the aforementioned shaking parameters, allows for a selective harvest of the berries, depending on the information recorded by the electronic control unit with respect to, for example, the variety and maturity of the grape, where such a harvesting method yield results which are comparable to those of a manually selective harvest, much in a more efficient manner.

According to another characteristic arrangement of the invention, the shaking system is equipped with position sensors continuously sensing the position of the gathering arms. These sensors can be angular sensors such as potentiometers which are positioned, for example, at the upper portion of the oscillating shafts of the berry picking assemblies. These angular sensors can continuously record and determine the angular position of each of the oscillating shafts. Other types of know linear sensors could also be used.

According to another characteristic arrangement of the invention, the electronic control unit is connected to a post detector equipping the shaking system, wherein it is programmed to reduce the shaking force when posts are encountered.

Due to this arrangement, fracture of the posts, especially concrete or wooden posts, is avoided.

BRIEF DESCRIPTION OF DRAWINGS

The aforementioned objects, characteristics and advantages, and others, will become apparent from the following description and annexed drawings in which.

DETAILED DESCRIPTION OF THE INVENTION

Reference is made to the drawings to describe an embodiment of the machine and of implementation of the method for selective harvest of berries according to the invention.

In order to not unduly, complicate the description and drawings, only the servo-control shaking system, is shown in the annexed drawings and described hereinafter, since the other portions thereof (frame, motor, vintage conveyors, receiving buckets, etc.) can be embodied in the normal manner known to one skilled in the art.

Moreover, while gathering arms of a particular type, and whose performance is remarkable, have been shown and described hereinafter, no exclusion is made of the possibility of using shakers of another kind, driven by reciprocating motions which they impart to the vegetation, and which currently equip most of the conventional grape gathering machines.

Figure 1:
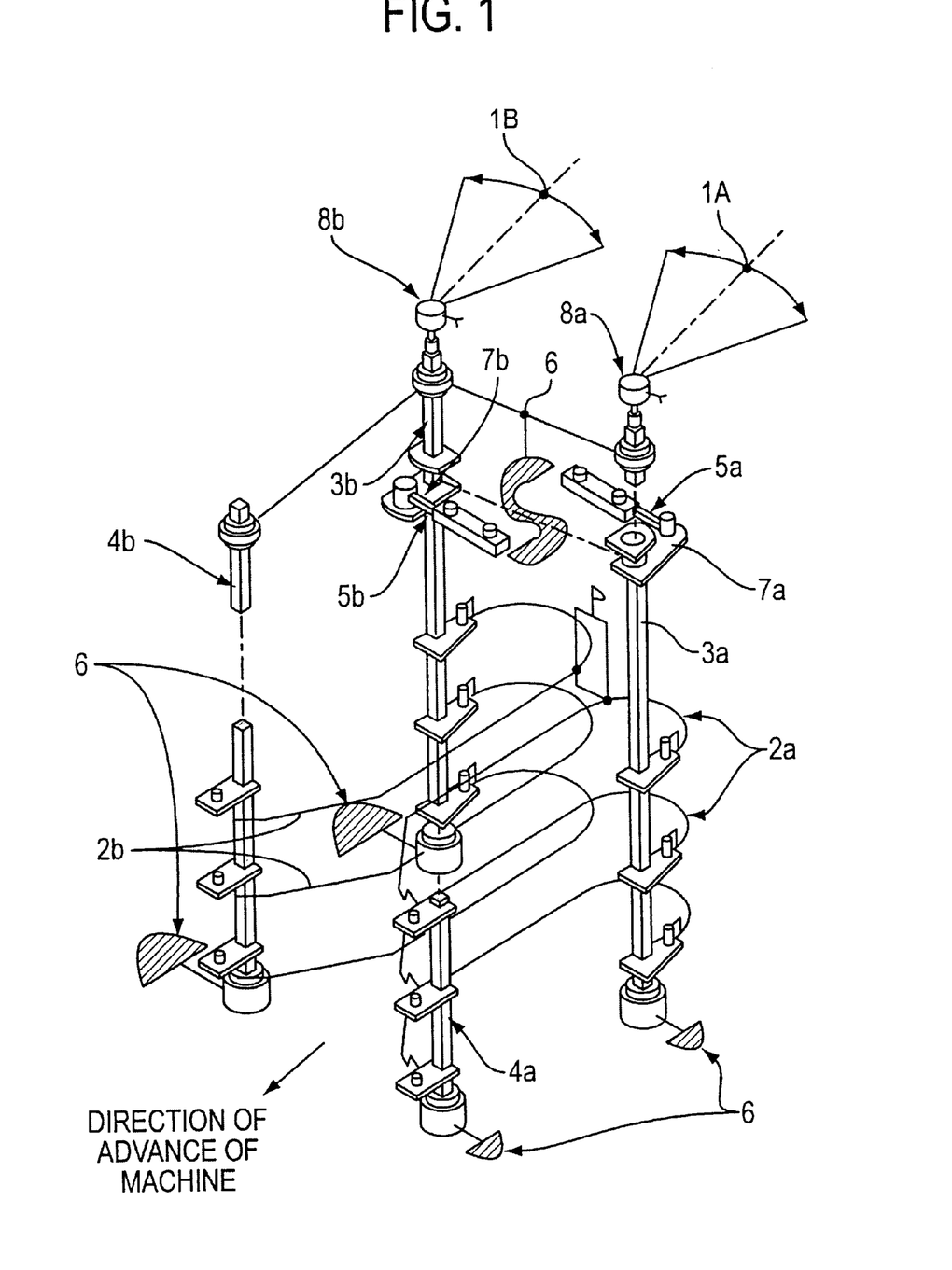
FIG. 1 is a perspective and schematic view of an example of embodiment of a controlled shaking system according to the invention.

FIG. 1 shows a shaking system having by two berry picking assemblies 1A and 1B each having, in the typical manner, a plurality of superposed gathering arms 2a, 2b which, according to the example illustrated, have semi-rigid flexible rods, of the kind described in the document FR-A-2 638 602, and a slanted front end and a bent rear end separated by a rectilinear or substantially rectilinear portion. Such shakers are fixed through their ends, on the one hand, to a first vertical shaft 3a, 3b mounted, with an oscillation capability about its longitudinal axis, on the frame 6 of the shaking system, and, on the other hand, to a second vertical shaft 4a, 4b which can be fixed, with respect to the frame 6, or installed with an oscillation latitude, or loosely mounted. It is noted that each berry picking assembly 1A and 1B could also utilize a single gathering arm 2.

The oscillation of each shaft 3a, 3b, is caused by a hydraulic jack, preferably of a type accepting substantial accelerations and speeds without notable wear, each of these jacks 5a, 5b is connected, through their opposing ends and journals, on the one hand, to a fixed element of the frame 6 of the shaking system, and, on the other hand, to a horizontal lever 7a, 7b rigidly affixed to the shaft 3a or 3b, respectively.

Alternatively, a single jack could be used for driving the two arms 3a, 3b simultaneously, for example, by connecting the latter with a coupling bar. However, the use of two jacks provides some very interesting advantages which appear in the following description.

Position sensors connected to the electronic control unit make it possible to constantly record the position of the gathering arms 2a, 2b.

Angular position sensors 8a, 8b positioned, for example, at the upper portion of the shafts 3a, 3b, respectively, and connected to the electronic control unit, make it possible to constantly record the angular position of each of these shafts. These sensors may be contactless angular sensors or position sensors, for example, utilizing potentiometers, which have an unlimited lifetime. It is noted, at this stage of the description, that the number of moving parts is very limited.

Figure 2:
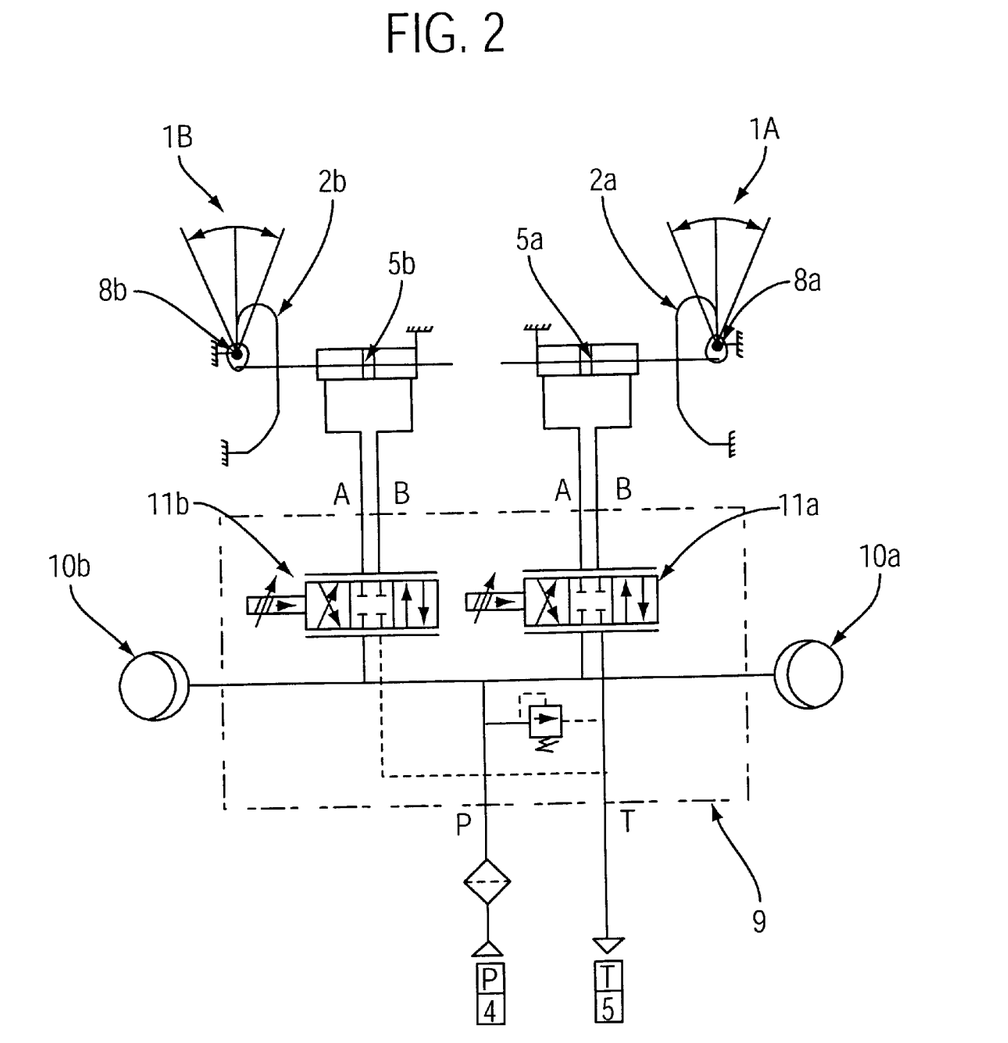
FIG. 2 shows the hydraulic diagram of the electronic device for driving the berry picking assemblies.

The jacks 5a, 5b, are actuated by a hydraulic assembly (FIG. 2) utilizing a hydraulic block 9 having pressure control, a hydro-pneumatic accumulator 10a, 10b, and two servovalves 11a, 11b. These two servovalves could be replaced by two proportional solenoid valves which perform the same function.

The servo-control shaking system according to the invention can be equipped with an automatic post detector (FIG. 3) arranged above the berry picking assemblies 1A, 1B. This detecting device can utilize two semi-rigid flexible rods 12a, 12b, whose general shape is similar to that of the shakers or gathering arms 2a, 2b, and which are fixed symmetrically across from one another, through their opposing ends and supports 13a, 13a', 13b, 13b', on two stationary facing elements of the frame 6 of the shaking system. These rods are not driven in oscillation during the operation of the shaking system. Furthermore, the supports 13a, 13b supporting the front end (considering the direction of forward motion of the machine: see the arrow of FIG. 3) of the detection rods 12a, 12b are equipped with accelerometers or impact detectors 14a, 14b, and are fixed to the frame 6 by means of shock mounts 15a, 15b.

Figure 3:
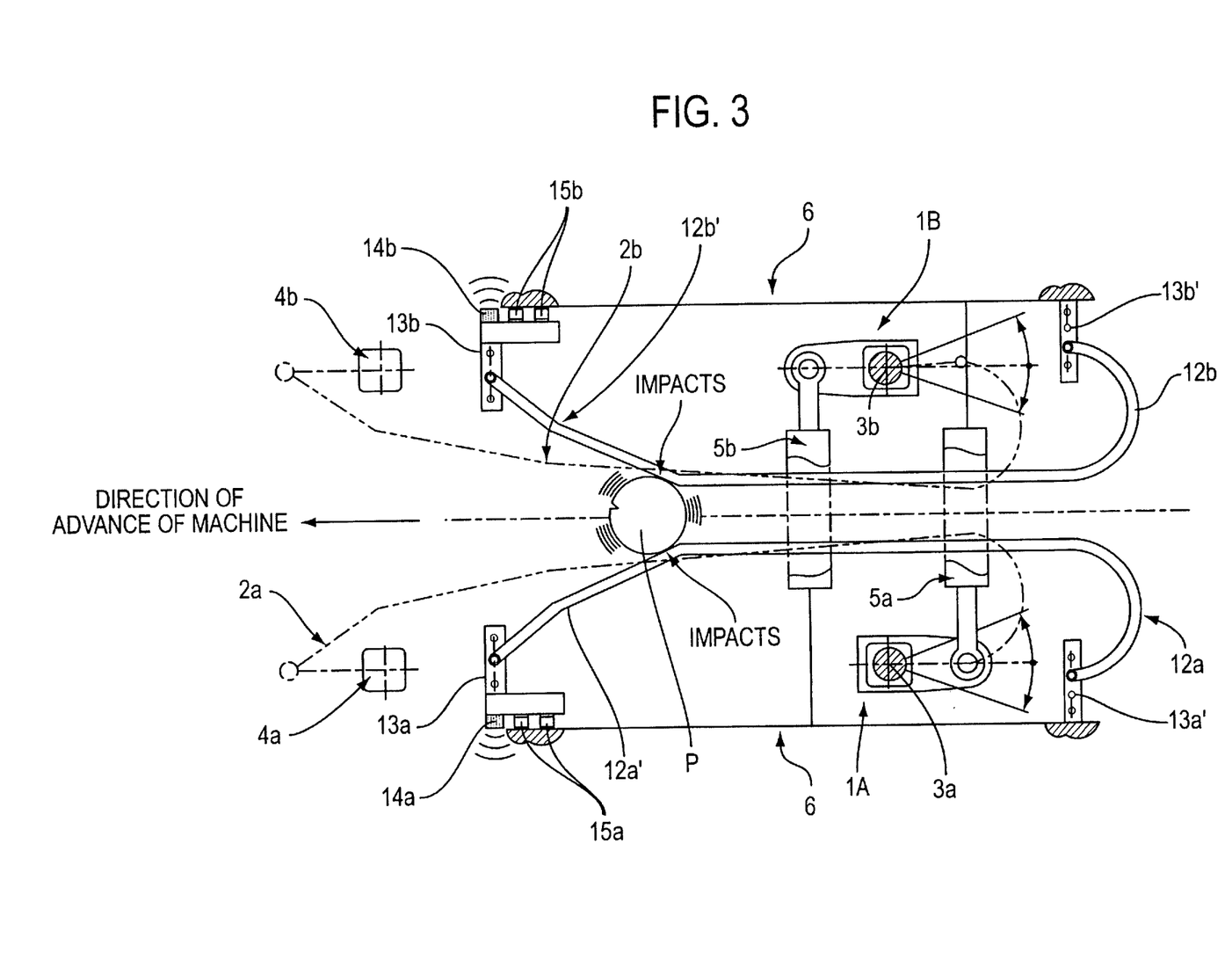
FIG. 3 is a planar and schematic view of the post detecting device equipping the shaking system.

When the machine is operating in the field, the movable gathering arms 2a, 2b displace a post Pi, the post in turn hits alternately the slanted front portion 12a', 12b', of the detection rods 12a, 12b, which are then subject to substantial accelerations which are detected by the accelerometers or by the impact detectors 14a, 14b, and the signals generated as a result are then transmitted to the electronic control system which is programed to reduce the rate and amplitude of the movements of the gathering arms, in order not to fracture the post.

Figure 4:
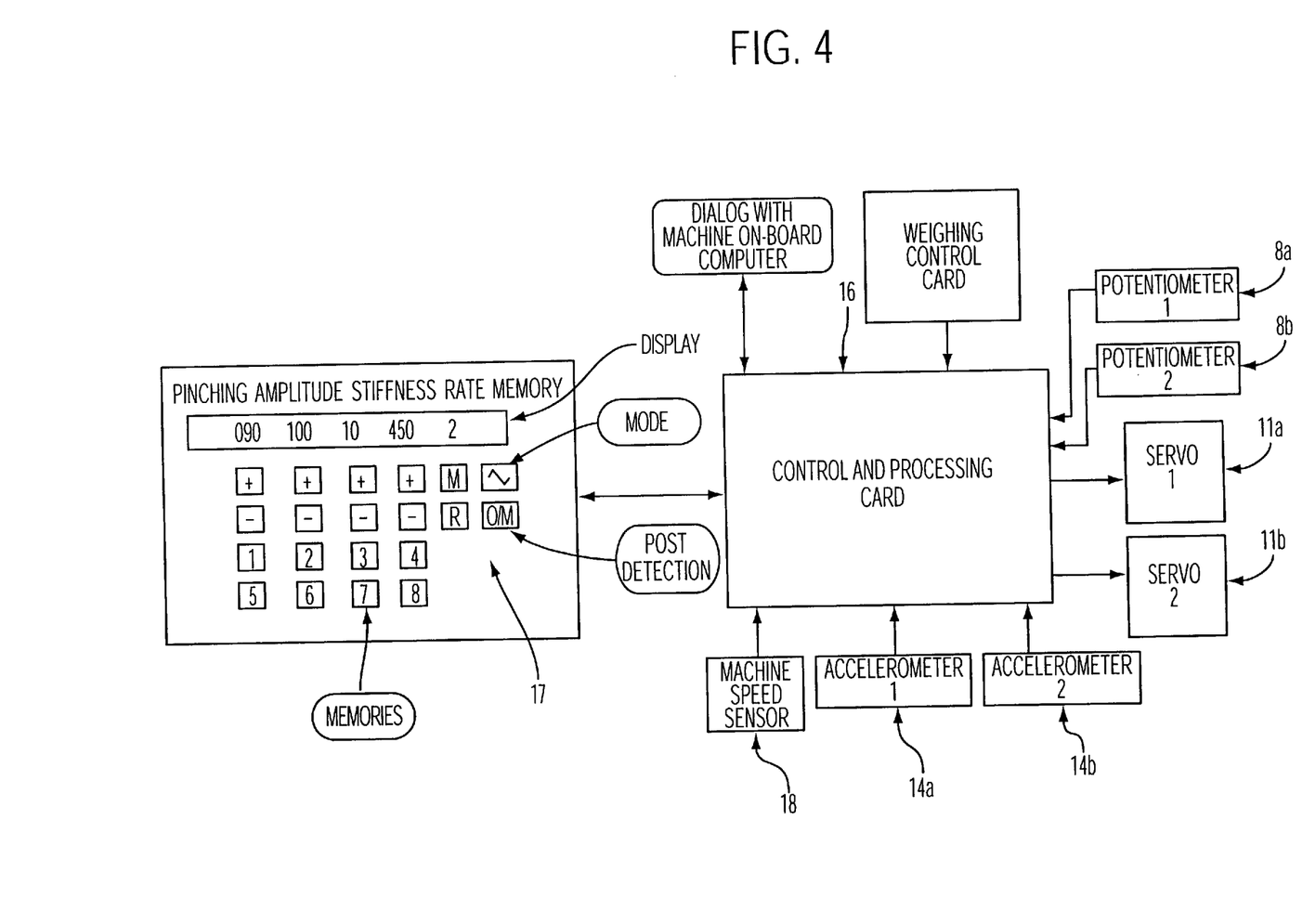
FIG. 4 is a block diagram of the electronic unit of the device and of the shaking method according to the invention.

The electronic control system (FIG. 4) utilize an electronic microprocessor card 16. This electronic card has digital and analog inputs and outputs, namely:

digital inputs: the control keyboard 17 and the sensor 18 of the machine advance speed;

analog inputs: the two (angular or linear) position sensors 8a, 8b, of the gathering arms 2a, 2b, the accelerometers or impact detectors 14a, 14b for detecting the posts;

analog outputs: the outputs toward the servovalves (or toward the proportional solenoid valves) 11a, 11b;

digital outputs: the control keyboard 17.

The control keyboard 17 makes it possible to enter the following shaking parameters into the system: amplitude, stiffness (acceleration), rate and pinching. These parameters are ideally optimized as a function of the variety and maturity of the product being harvested, and can be saved into memory to be used again as necessary.

An operator can also select the operation a mode which is: mode non-proportional to the advance, a proportional mode, and a proportional mode with decompression cycle. The operator may also adjust the shaking parameters which will be used only upon passing the posts.

Once the parameters are defined, the microprocessor control card analyzes them and generates control signals for each servovalve 11a, 11b, within a control loop, for example, of the PI controller or PID controller type in which the potentiometers 8a, 8b, via analog/digital converters, transmit the position of the gathering arms to the control loop. The conventional shaking with which all of the grape gathering machines are currently equipped, utilizing a shaking motion which is generated by the connecting rod/crankshaft systems and which based upon a fixed sine law. This form of shaking has its drawbacks: for example there is no way to adjust the acceleration and rate independently. Therefore, it is not possible to mechanically obtain shaking which is proportional to the advance.

However, it is known that on undulating terrains i.e., fields which are not flat, it is not always possible to maintain a constant advance speed. As a result, the operator is typically led to select average parameters.

According to the invention, the electronic control unit can be programmed so that the shaking rate is set proportional to the advance speed of the machine. This allows the vinestock to be subject to the same number of strokes and to the same acceleration regardless of the advance speed. To further understand this motion, reference can be made to FIGS. 5, 6, 7 and 8.

Figure 5:
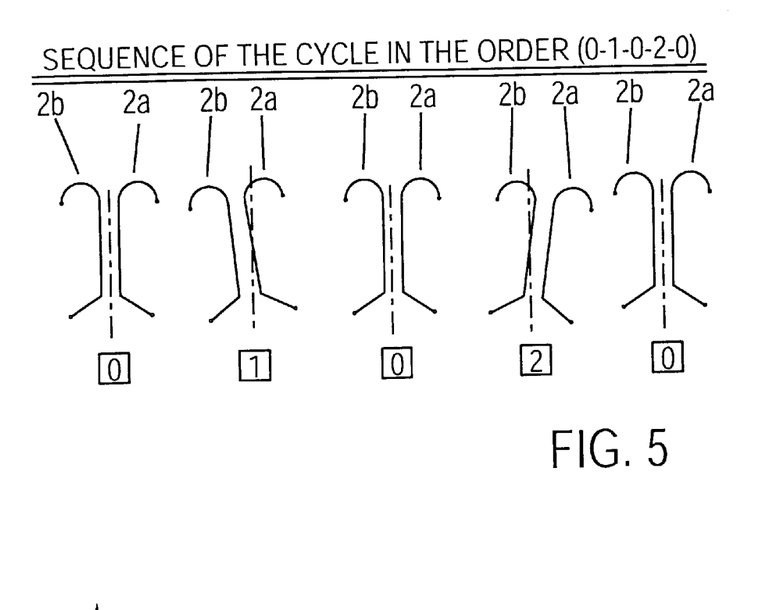
FIGS. 5–8 are schematic views illustrating the adaptation of the duration of the shaking cycle to the advance speed of the machine.

FIG. 5 is the schematic representation of the cycle of the transformations two associated gathering arms are subject to during the shaking.

Figure 6:
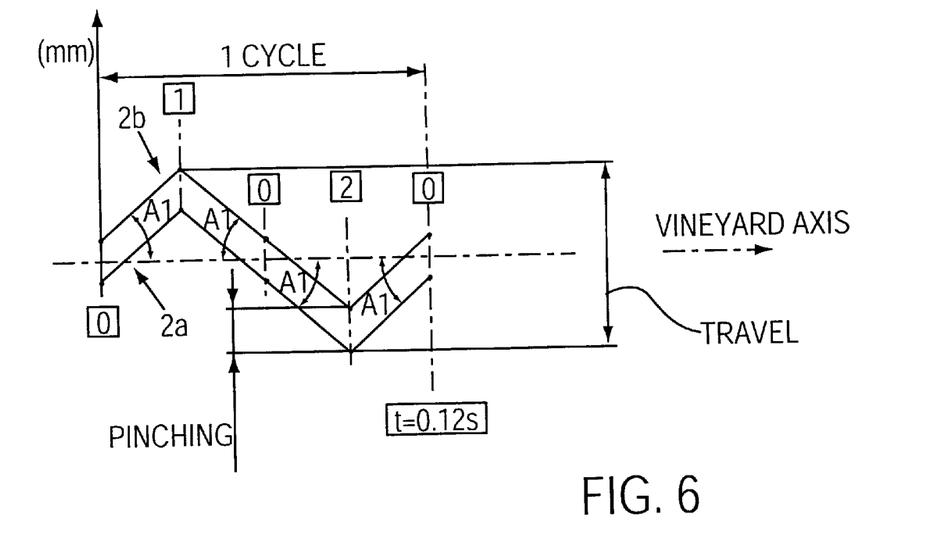
Figure 7:
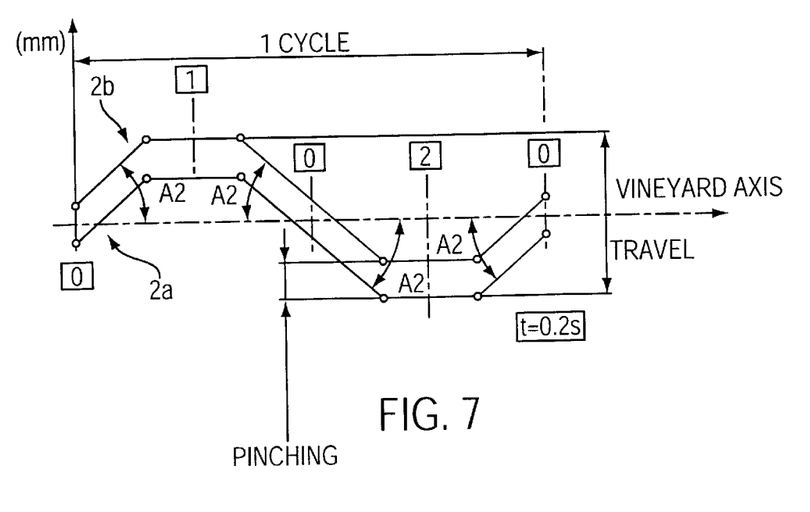
Figure 8:
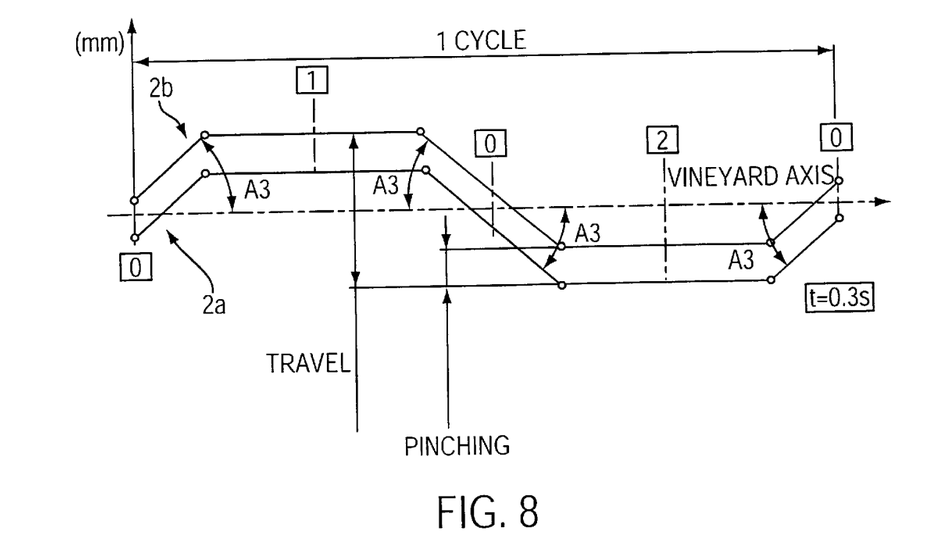

The diagrams of FIGS. 6, 7 and 8 show, by way of example only, the variations in the duration of a shaking cycle, as a function of the displacement speed of the machine:

- FIG. 6 shows a 0.12 second cycle corresponding to a shaking rate of 500 strokes/mn for a machine advance speed of 5 km/hr;
- FIG. 7 shows a 0.2 second cycle corresponding to a shaking rate of 300 strokes/mn for a machine advance speed of 3 km/hr;
- FIG. 8 shows a 0.3 second cycle corresponding to a shaking rate of 200 strokes/mn for a machine advance speed of 2 km/hr.

As indicated previously, it is important in order to provide for a more consistent harvest that each vine stock be subject to the same acceleration, regardless of the advance speed of the machine. For this reason, according to the method of the invention, idle times are generated at each change of cycle, and whose duration is proportional to the decrease in the advance speed of the machine. This the shaking can be set rate below, predetermined thresholds, for example, below a shaking rate of 500 strokes/mn and a machine advance speed of 5 km/hr, according to the example retained. In this way, the acceleration of the shakers or gathering arms (2a, 2b) remains identical, regardless of the advance speed of the harvesting machine and the shaking rate.

This characteristic arrangement will be better understood with reference to FIGS. 11, 6, 7, and 8, in which the slopes designated by the arrows A, A1, A2, A3, respectively, are identical.

With conventional mechanical shaking machines and methods having a connecting rod/crank system, the gathering arms are always displaced with a fixed pinching (FIGS. 5–8). This pinching is typically very small (10 cm maximum) and the vegetation is therefore forced to pass entirely through this reduced space. For example, the vegetation of the Bordeaux vineyard which has a thickness of about 30–40 cm, is forced to pass through an 8 cm spacing. Such a compression of the vegetation has significant disadvantages, for example, it can produce fracturing of the wood, heavy fall of the leaves, bending of the posts, deterioration of the bunches of fruits, and an uncontrolled drop of the berries onto the conveyors of the machine.

According to another characteristic arrangement of the invention, the electronic control unit is programmed to successively control the servovalves 11a, 11b for actuating the right and left assemblies of the gathering arms 2a, 2b, respectively, so as to ensure a non-simultaneous displacement of the latter.

Figure 9:
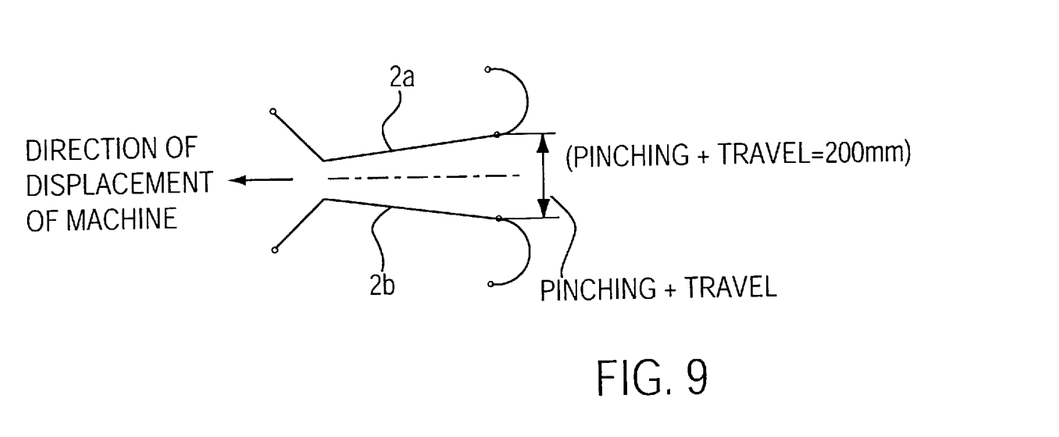
FIGS. 9–11 are schematic views explaining the operation of the shaking system in a decompression mode.
Figure 10:
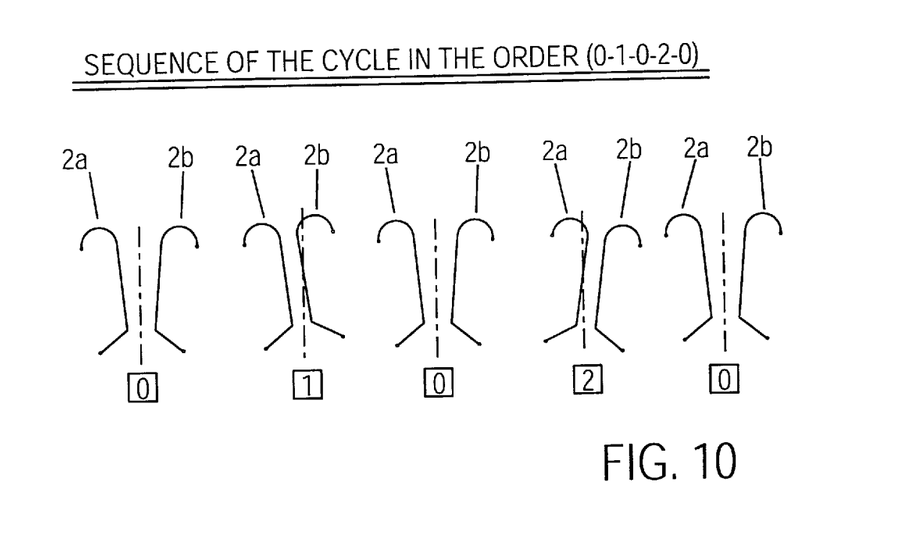
Figure 11:
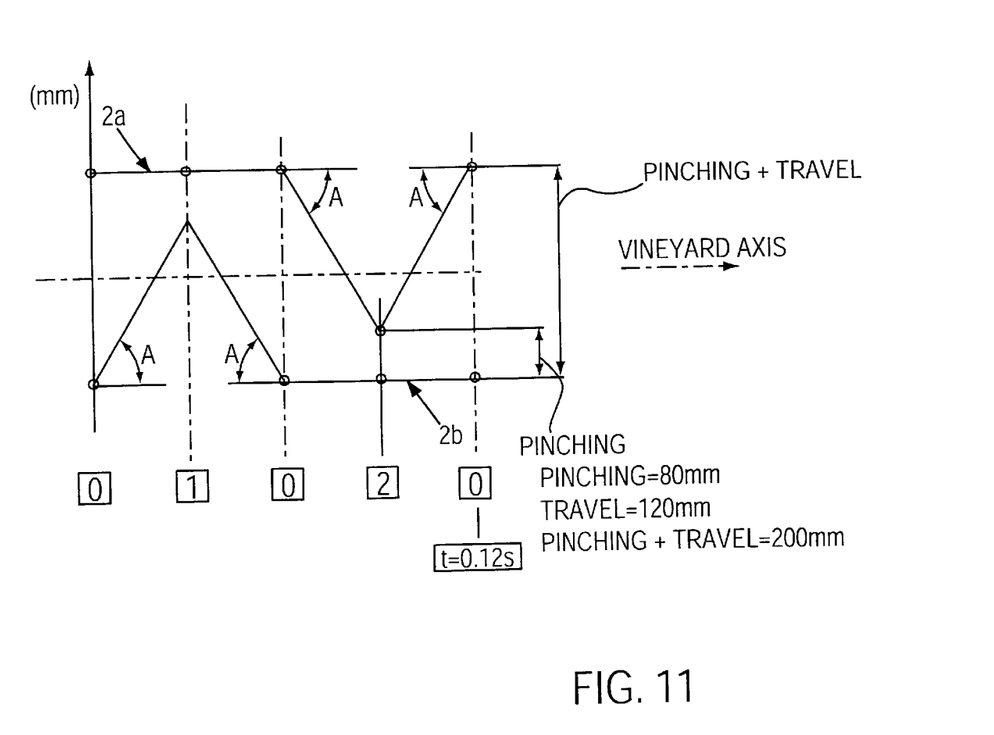

This shaking cycle, also called automatic decompression cycle, is schematically illustrated in FIGS. 9–11.

It is noted that with a change of the shaking or vibration, there is always one gathering arm assembly that advances toward the vegetation, whereas the other moves away simultaneously from the latter. In conventional machines and methods, the gathering arms of the two assemblies which are displaced simultaneously remain at a fixed distance (pinching) with respect to one another. However, in the automatic decompression cycle according to the invention, for the same alternation, the gathering arm assembly (assembly 1A, for example) that moves away from the vegetation is displaced first, whereas the other assembly (assembly 1B) remains fixed. When this assembly reaches the end of the travel, it stops. At this point, the other assembly (assembly 1B) is in turn displaced until reaching the end of its travel, etc.

It is noted that, according to this automatic decompression cycle, a pinching is obtained which is equal to the initial pinching, plus the travel.

For example, in the preceding case of 8 cm pinching, we have 8 cm+12 cm of travel=20 cm.

FIGS. 9–11 describe the shaking method by decompression, FIG. 11 schematically showing, by way of example only, a 0.12 s automatic decompression cycle corresponding to a shaking rate of 500 strokes/mn for a machine advance speed of 5 km/hr.

The combination of setting the cycle proportional to the advance and of the automatic decompression cycle makes it possible to control, in terms of advance speed, homogeneity and quality of the harvest, and this produces a reduction of the ground losses. These advantages cannot be are not realized by the conventional system.

The shaking method and machine according to the invention also allows for better protection of farm equipment, tends to produce a healthier grape gathering such that berries are not crushed as much, provides for more whole bunches, and offers better protection to the training, more particularly of the concrete or wooden posts.

What is claimed is:

1. A machine for selectively harvesting berries comprising:
    a shaking system comprising at least two berry picking assemblies, each assembly comprising at least one gathering arm;
    at least one driving electro-hydraulic device having at least one hydraulic jack and coupled to said shaking system;
    at least one control valve for controlling said at least one hydraulic jack, said at least one control valve comprising one of at least one servovalve and at least one proportional solenoid valve;
    an electronic control unit for controlling said at least one control valve;

wherein said machine generates any number of harvesting movements.

2. The machine of claim 1, wherein said berries are grapes.

3. The machine of claim 1, wherein the at least one gathering arm comprises a plurality of superposed gathering arms.

4. The machine of claim 1, wherein the electronic control unit has a microprocessor.

5. The machine of claim 4, further comprising position sensors for recording the position of the berry picking assemblies.

6. The machine of claim 5, wherein said sensors communicate with said electronic control unit so as to record the position of the gathering arms.

7. The machine of claim 6, wherein said sensors continuously record the position of the gathering arms.

8. The machine of claim 5, wherein said berry picking assemblies comprise oscillating shafts and said position sensors comprise angular sensors, wherein said angular sensors record the angular position of the oscillating shafts.

9. The machine of claim 5, wherein said position sensors are of the potentiometer type.

10. The machine of claim 5, wherein the position sensors are linear sensors.

11. The machine of claim 1, wherein said electronic control unit is connected to a post detecting device arranged adjacent the berry picking assemblies.

12. The machine of claim 11, wherein said machine is programmable so to reduce the shaking when said post detecting device detects a post.

13. The machine of claim 11, wherein said post detecting device comprises at least two semi-rigid flexible rods fixed across from one another on two stationary facing elements.

14. The machine of claim 13, wherein said post detecting device further comprises:
supports for attaching said flexible rods to a frame of the shaking system, wherein said supports support a front end of the detection rods; and
one of, accelerometers and impact detectors, which are fixed to the frame by shock mounts.

15. The machine of claim 1, wherein said electronic control unit has memory storage for storing and retrieving data relating to at least one of, lot type and variety of vine.

16. The machine of claim 1, wherein said at least two berry picking assemblies define a space therebetween for allowing at least one row of vines to pass through said space.

17. The machine of claim 1, wherein each of said berry picking assemblies is coupled to a distinct driving electro-hydraulic device having a hydraulic jack controlled by a distinct control valve, each of said distinct control valves being controlled by said electronic control unit.

18. The machine of claim 1, further comprising an automatic post detector arranged above said berry picking assemblies.

19. The machine of claim 18, wherein the automatic post detector comprises at least one semi-rigid flexible detection rod having ends mounted on supports.

20. The machine of claim 19, wherein at least one of the supports comprises one of an accelerometer and an impact detector.

21. The machine of claim 20, wherein at least one of the supports is fixed to a frame of the machine via shock mounts.

22. A method of selectively harvesting berries comprising:
shaking the berries with a system comprising at least two berry picking assemblies, each assembly comprising at least one gathering arm;
driving at least one electro-hydraulic device having at least one hydraulic jack which is coupled to said shaking system;
controlling a movement of said at least one hydraulic jack with at least one control valve, the at least one control valve comprising one of at least one servovalve and at least one proportional solenoid valve; and
controlling said at least one control valve with an electronic control unit,
wherein said shaking generates any number of harvesting movements.

23. The method of claim 22, wherein said shaking is performed by a plurality of superposed gathering arms.

24. The method of claim 22, wherein said controlling said at least one control valve is performed by said electronic control unit comprising a microprocessor.

25. The method claim 22, wherein said driving comprises at least two distinct electro-hydraulic devices which are coupled to said system.

26. The method of claim 22, wherein said driving utilizes at least two jacks which are each controlled by a distinct control valve.

27. The method of claim 26, wherein said distinct control valve comprises one of a servovalve and a proportional solenoid valve.

28. The method of claim 22, further comprising:
sensing said movement of, one of, said at least one driving device and said at least one gathering arm.

29. The method of claim 28, further comprising:
communicating said sensing to said electronic control unit.

30. The method of claim 28, wherein said sensing comprises recording a position of said at least one gathering arm.

31. The method of claim 28, wherein said sensing is continuous.

32. The method of claim 22, further comprising:
detecting a post and communicating said detecting to said electronic control unit.

33. The method of claim 22, further comprising adjusting said movement in response to detecting by said electronic control unit.

34. The method of claim 22, further comprising controlling said shaking by a set of computer instructions in the form of a computer program.

35. The method of claim 28, further comprising controlling said shaking at a rate which is proportional to an advance speed of said machine.

36. The method of claim 35, wherein the shaking is performed on a vinestock, said vinestock being subject to the same number of strokes and accelerations, regardless of said advance speed.

37. The method of claim 22, further comprising:
programming said electronic control to generate, at each change of cycle, idle times of a duration proportional to a decrease in an advance speed of said machine, said programming determining a shaking rate below a predetermined threshold, such that an acceleration of said shaking remains constant, regardless of said advance speed of said machine and said shaking rate.

38. The method of claim 22, further comprising:
programming said electronic control unit to perform said controlling said at least one control valve.

39. The method of claim 38, wherein said shaking is performed by at least one right and left gathering arm, and wherein said controlling is performed by first and second control valves for successively actuating their respective gathering arm, so as to ensure a non-simultaneous displacement of said gathering arms.

40. The method of claim 22, further comprising:
programming optimum parameter data for a harvest into a memory area of said electronic control unit.

41. The method of claim 40, further comprising retrieving said data from said memory and using said data year after year to provide consistent harvesting of essentially identical varieties of berries by way of a database of information relating to at least one of, lot type and variety of vine.

42. A machine for selectively harvesting berries comprising:
a shaking system comprising at least two berry picking assemblies, each assembly comprising at least one gathering arm;
at least one driving device coupled to said shaking system; and
an electronic control unit for controlling said at least one driving device,
wherein each of said berry picking assemblies is coupled to a driving electro-hydraulic device having a hydraulic jack and each assembly is controlled by a distinct control valve, and wherein said machine generates any number of harvesting movements.

43. The machine of claim 42, wherein said distinct control valve comprises one of, a servovalve and a proportional solenoid valve, and each of said distinct control valves is controlled by said electronic control unit.

44. A machine for selectively harvesting berries comprising:
a shaking system comprising at least two berry picking assemblies, each assembly comprising at least one gathering arm and at least one oscillating shaft;
at least one driving device coupled to said shaking system;
an electronic control unit for controlling said at least one driving device;
each of said at least two berry picking assemblies comprising a position sensor for recording the position of the berry picking assemblies, each position sensor comprising an angular sensor which records the angular position of the oscillating shafts,
wherein said machine generates any number of harvesting movements.

45. The machine of claim 44, wherein each position sensor is a potentiometer type sensor.

46. The machine of claim 44, wherein each position sensor is a linear sensor.

47. A machine for selectively harvesting berries comprising:
a shaking system comprising at least two berry picking assemblies, each assembly comprising at least one gathering arm;
at least one driving device coupled to said shaking system;
an electronic control unit for controlling said at least one driving device, and
a post detecting device arranged adjacent the berry picking assemblies, said post detecting device being connected to said electronic control unit;
said shaking system being adjusted by said electronic control device when a post is detected by said post detecting device,
wherein said machine generates any number of harvesting movements.

48. The machine of claim 47, wherein said machine is programmable so to reduce the shaking when said post detecting device detects a post.

49. The machine of claim 47, wherein said post detecting device comprises at least two semi-rigid flexible rods fixed across from one another on two stationary facing elements.

50. The machine of claim 49, wherein said post detecting device further comprises:
supports for attaching said flexible rods to a frame of the shaking system, wherein said supports support a front end of the detection rods; and
one of, accelerometers and impact detectors, which are fixed to the frame by shock mounts.

51. A method of selectively harvesting berries comprising:
shaking the berries with a system comprising at least two berry picking assemblies, each comprising at least one gathering arm;
driving at least one device which is coupled to at least one of the berry picking assemblies, said driving utilizing at least two jacks which are each controlled by a distinct control valve; and
controlling a movement of said at least one device with an electronic control unit,
wherein said shaking generates any number of harvesting movements.

52. The method of claim 51, wherein said distinct control valve comprises one of a servovalve and a proportional solenoid valve.

53. A method of selectively harvesting berries comprising:
shaking the berries with a system comprising at least two berry picking assemblies, each assembly comprising at least one gathering arm;
driving at least one device which is coupled to said shaking system;
controlling a movement of said at least one device with an electronic control unit;
detecting a post using a post detecting device and communicating said detecting to said electronic control unit; and
adjusting said shaking system with said electronic control unit when a post is detected by said post detecting device,
wherein said shaking generates any number of harvesting movements.

54. The method of claim 53, further comprising continuously adjusting said movement in response to detecting by said electronic control unit.

55. A method of selectively harvesting berries comprising:
shaking the berries with a system comprising at least two berry picking assemblies, each comprising at least one gathering arm;
driving at least one device which is coupled to at least one of the berry picking assemblies;
controlling a movement of said at least one device with an electronic control unit; and
controlling said shaking at a rate which is proportional to an advance speed of said machine,
wherein said shaking generates any number of harvesting movements.

56. The method of claim 55, wherein the shaking is performed on a vinestock, said vinestock being subject to the same number of strokes and accelerations, regardless of said advance speed.

57. A method of selectively harvesting berries comprising:
- shaking the berries with a system comprising at least two berry picking assemblies, each comprising at least one gathering arm;
- driving at least one device which is coupled to at least one of the berry picking assemblies;
- controlling a movement of said at least one device with an electronic control unit; and
- programming said electronic control to generate, at each change of cycle, idle times of a duration proportional to a decrease in an advance speed of said machine, said programming determining a shaking rate below a predetermined threshold, such that an acceleration of said shaking remains constant, regardless of said advance speed of said machine and said shaking rate,
- wherein said shaking generates any number of harvesting movements.

58. A method of selectively harvesting berries comprising:
- shaking the berries with a system comprising at least two berry picking assemblies, each comprising at least one gathering arm;
- driving at least one device which is coupled to at least one of the berry picking assemblies;
- controlling a movement of said at least one device with an electronic control unit; and
- programming said electronic control unit to perform said controlling, wherein said shaking is performed by at least one right and left gathering arm, and wherein said controlling is performed by first and second control valves for successively actuating their respective gathering arm, so as to ensure a non-simultaneous displacement of said gathering arms and wherein said shaking generates any number of harvesting movements.

* * * * *